(No Model.)
L. R. WITHERELL.
SPHERICAL COFFEE ROASTER.
No. 361,660. Patented Apr. 19, 1887.
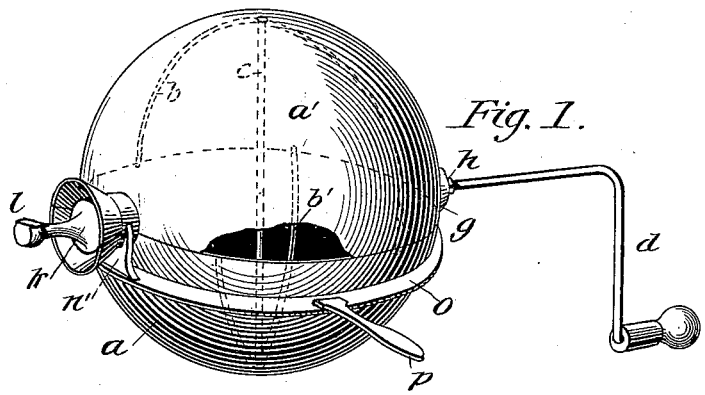
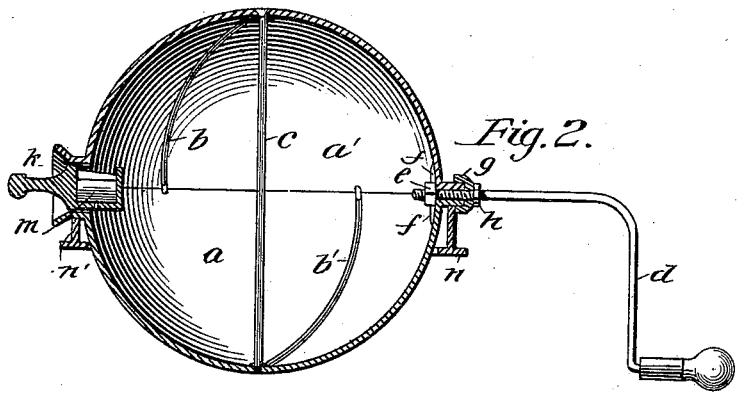
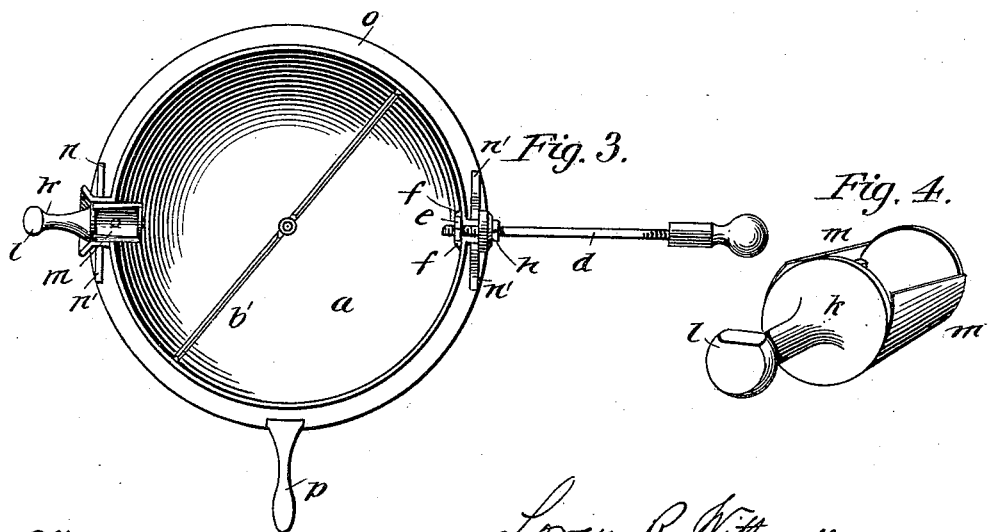
Witnesses
Loren R. Witherell, Inventor
By his Attorney

UNITED STATES PATENT OFFICE.

LOREN R. WITHERELL, OF DAVENPORT, IOWA, ASSIGNOR OF ONE-HALF TO EDWARD RUSSELL AND JOHN N. GREER, BOTH OF SAME PLACE.

SPHERICAL COFFEE-ROASTER.

SPECIFICATION forming part of Letters Patent No. 361,660, dated April 19, 1887.

Application filed August 28, 1886. Serial No. 212,105. (No model.)

*To all whom it may concern:*

Be it known that I, LOREN R. WITHERELL, a citizen of the United States, residing at Davenport, in the county of Scott and State of Iowa, have invented certain new and useful Improvements in Spherical or Globe Coffee-Roasters; and I do hereby declare the following to be a full, clear, and exact description of the invention, such as will enable others skilled in the art to which it appertains to make and use the same.

This invention relates to improvements in revolving globe or spherical coffee-roasters. It has for its object the thorough, uniform, and quick roasting of coffee, and accomplishes this object by the arrangement of the parts hereinafter more particularly described.

The invention consists in the novel combination and construction of the several parts.

Figure 1 is a perspective view of my coffee-roaster. Fig. 2 is a sectional view. Fig. 3 is a plan view, the upper section removed. Fig. 4 shows the scoop-stopper.

My coffee-roaster is made of two half-spheres, preferably of cast-iron. These, being placed one over the other, form a hollow globe with a smooth exterior. Each half being identical with the other, only one mold and no core is required in the casting. The two parts are held together by a screw-bolt passing through the center perpendicular to the axis. The journal ends are hollow, the larger one having a flaring or funnel-shaped mouth and provided with a scoop-stopper. The other (the smaller) admits the screw-threaded end of the crank-handle, by which the roaster is revolved. These journals rest in the bearings of a round frame or ring, also of cast-iron, provided with a handle for convenience in lifting it. By means of this ring the roaster can be used on any cooking stove or range.

The half-spheres are indicated by the letters a a', each half being exactly alike. On the interior surfaces of these spheres the raised distributing-flanges b b', cast with the sphere run obliquely to the axis of the globe from edge to edge, broken in the centers, however, for the holes of the connecting-bolt c. The flanges terminate in points which project slightly above the edge of the half-globe, and serve to keep the parts in a true position toward each other. In this position they are secured by the perpendicular screw-bolt c. The external parts of the holes in the spheres for this bolt are countersunk for the head and the nut, by which it is secured at the bottom.

It will be seen that the distributing-flanges, being arranged obliquely to the axis of the globe, do not form a continuous ring on the interior surface when the two parts are united, but rather two half-rings arranged opposite to and at right angles with each other. This arrangement, throwing the coffee from end to end, as it were, at each revolution, secures a perfect distribution or mixture of the grains of coffee within the globe and brings every particle successively into contact with the heat. The uniform roasting of every grain is thus secured, none being left unbrowned or only partially cooked. The distribution is also aided by the central bolt.

The smaller journal ends of the spheres, being hollow, admit the screw end of the crank-handle d, which is secured by a square nut, e, on the inside, the two lugs f f, cast on the inside of the sphere, holding the nut in its place and preventing its turning with the forward motion of the crank, without at the same time revolving the globe. The ends of this journal are held tightly together by the sliding collar g on the crank-rod. This collar is tightened over the journal ends by the small nut h on the crank. The other journal end is made larger, with a flaring or funnel mouth for the admission of the coffee or the pouring of it out after it has been roasted. This mouth is stopped, when the coffee is put in, by the scoop-shaped stopper k, Fig. 4. This stopper is also cast in a single piece, the inner or point end having a full disk and the outer end a handle or finger-piece flattened on the upper side, l. A jacket of tin, m, or other elastic metal, riveted or fastened on the under or solid side of this scoop, surrounds about three-fourths of it, but is left open with free edges on the upper or open side. This spring-jacket serves to keep the stopper tightly in its place in the mouth of the roaster. The flattened top of the thumb-piece l or handle of this stopper indicates to the operator the upper or open side of the scoop when he wishes to withdraw it for the purpose of testing whether the coffee has been sufficiently browned. As all the coffee within the globe is completely turned over at each revolution, that which lodges in the scoop will always exhibit the condition of all the rest.

The journal ends rest in bearings $n\ n'$, cast integral with the flat ring $o$, and adapted to the size of the respective journals. The ring fits over the open hole of the range or cooking-stove, and, being made of sufficient breadth, may be used on any stove. It is provided with the handle $p$ for convenience in placing it upon or removing it from the stove. This ring being placed over the open pot-hole and the globe resting by its journals in the bearings, the swell of the globe is brought into direct contact with the heat from the fire. The thickness of the metal and the gradual revolution of the globe secure a uniform heat in all its parts. The coffee within being continually turned over and over by the distributing-flanges, all the particles are successively brought into contact with the heat and uniformly browned, preserving all of the delicious aroma.

Any small amount of coffee may be roasted in this apparatus in a few minutes; but the globe should be never more than half filled. The scoop-stopper enables the cook to test at any minute the exact condition of the coffee within and whether it has been sufficiently browned.

This roaster may be easily taken apart when the interior may need cleaning by unscrewing the center bolt and loosening the collar on the crank-journal.

I claim as of my invention and desire to secure by Letters Patent—

1. In a coffee-roaster, the combination of two half-globes fastened together by a perpendicular bolt, each half having on its interior surface a projecting flange arranged obliquely to the axis of the globe, and hollow projecting ends forming journals when joined together, one of said journal ends having a flaring or funnel-shaped mouth, and the other having the lugs $f\ f$ on the interior, to hold in place the nut on the screw end of the turning-crank $d$, with the collar $g$, fitting over and holding together the halves forming the journal, and the turning-crank and supporting frame or ring $o$, having open semicircular bearings for the journals, substantially as described, and for the purposes set forth.

2. In combination with a globe coffee-roaster, the scoop-stopper $k$, having the spring-jacket $m$ riveted or fastened thereon, substantially as shown and described, and for the purposes set forth.

In testimony whereof I affix my signature in presence of two witnesses.

LOREN R. WITHERELL.

Witnesses:
E. H. ALBRECHT,
WM. JACKSON.